United States Patent [19]

Hardman

[11] Patent Number: 4,633,534
[45] Date of Patent: Jan. 6, 1987

[54] UNIVERSAL TOILET TANK SHUT-OFF ASSEMBLY

[76] Inventor: Ronald P. Hardman, 1046 W. Tropicana Ct., Ontario, Calif. 91762

[21] Appl. No.: 602,321

[22] Filed: Apr. 20, 1984

Related U.S. Application Data

[63] Continuation-in-part of Ser. No. 529,940, Sep. 7, 1983, abandoned, which is a continuation-in-part of Ser. No. 499,304, May 31, 1983, abandoned.

[51] Int. Cl.⁴ .............................................. E03D 5/092
[52] U.S. Cl. .................................................... 4/412
[58] Field of Search ..................... 4/324, 325, 410–412, 4/414, 415, 427, 405

[56] References Cited

U.S. PATENT DOCUMENTS

| | | | |
|---|---|---|---|
| 948,876 | 2/1910 | Geiger | 4/324 |
| 2,295,686 | 9/1942 | Pleasant et al. | 4/405 |
| 2,927,327 | 3/1960 | Flieder | 4/427 X |
| 3,426,365 | 2/1969 | Ament et al. | 4/405 |
| 3,787,902 | 1/1974 | McCombs | 4/325 |
| 4,067,074 | 1/1978 | Harrison | 4/324 |
| 4,240,167 | 12/1980 | Gilliland | 4/427 X |

Primary Examiner—Charles E. Phillips
Attorney, Agent, or Firm—Edgar W. Averill, Jr.

[57] ABSTRACT

A universal shut-off device for stopping the flow of water from a toilet tank to a toilet bowl during the flushing of the toilet. The device is mountable on toilet tanks having a handle on either the right-hand side or the left hand-side of the tank. The device has a stop handle accessible from the exterior of the toilet tank. If the plumbing is partially or completely plugged up and the toilet bowl begins to overflow during flushing, the flow of water into the bowl can immediately be shut off during the flushing operation. This is carried out by turning a stop handle which causes the tank ball to move against the valve seat and stop the flow of water from the toilet tank to the toilet bowl. A bendable and ductile operator arm is shaped by the user to push against the tank ball.

5 Claims, 6 Drawing Figures

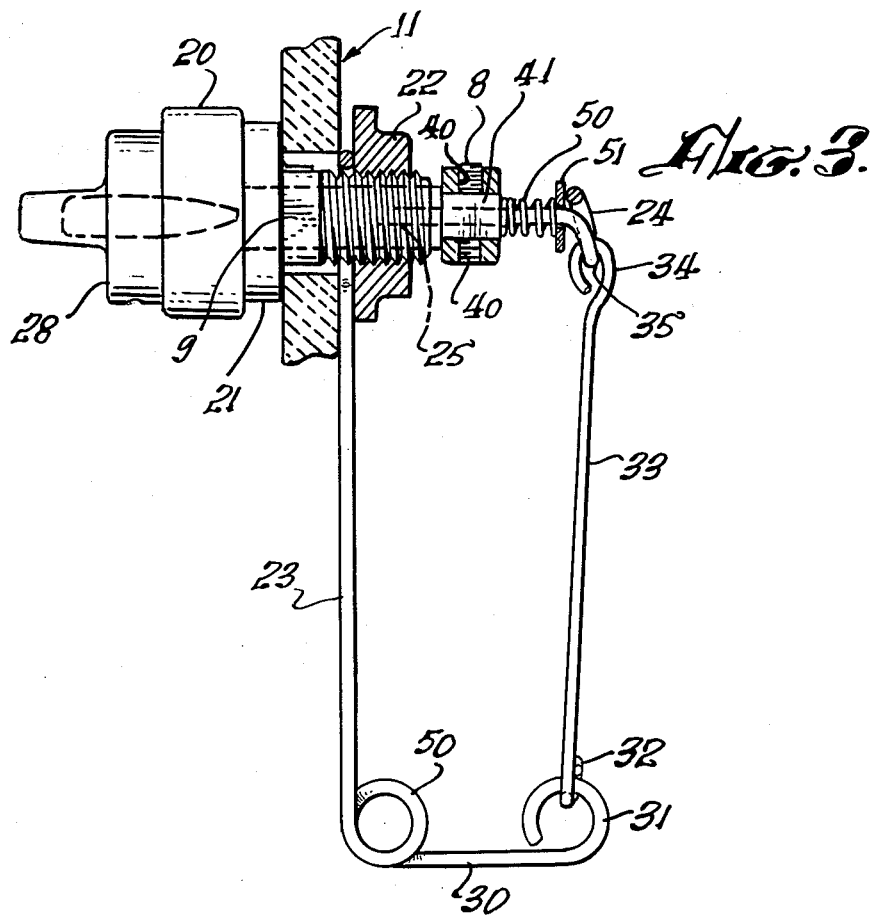
Fig. 3.
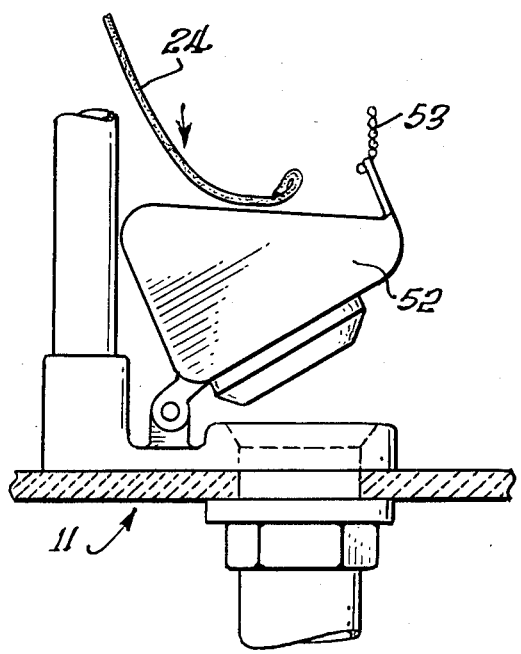
Fig. 6.
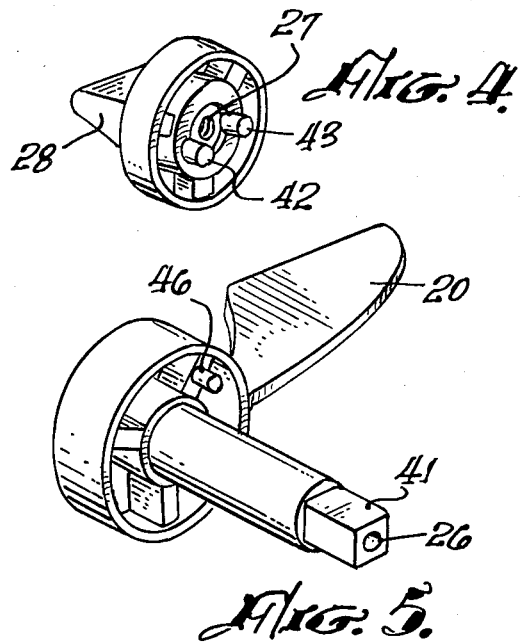
Fig. 4.
Fig. 5.

UNIVERSAL TOILET TANK SHUT-OFF ASSEMBLY

CROSS REFERENCE TO RELATED APPLICATIONS

This application is a continuation-in-part of applicant's application Ser. No. 529,940 filed Sept. 7, 1983, now abandoned, which in turn is a continuation-in-part of applicant's application Ser. No. 499,304, filed May 31, 1983, now abandoned, which are entitled "Toilet Tank Shut Off Assembly".

BACKGROUND OF THE DISCLOSURE

The field of the invention is plumbing devices and the invention relates more specifically to devices for stopping the flow of water during the flushing of a toilet.

More particularly, the present device is mountable on toilet tanks having a handle on either the right-hand side or the left-hand side of the tank.

Occasionally, the drain line connecting the toilet to the sewer system will become blocked and, during flushing, the water as it flows from the toilet tank into the toilet bowl will have no means for leaving the toilet bowl and thus will tend to overflow the bowl. Although it would be possible for the user to remove the cover of the toilet tank and reach in and shut off the flow of water from the tank, this usually requires more time than is available and the result is the overflow of a relatively large amount of water onto the floor. This can create a severe inconvenience as well as a source of damage, mold and a malodorous bathroom.

Various elaborate devices have been devised to prevent the shut off of the flow of water during a flush such as those shown in the following U.S. Pat. Nos: 948,876; 1,956,087; 2,440,389; 2,685,694; 2,729,827 and 4,240,167. Unfortunately, most of these devices are not usable on existing float valve assemblies but instead require an entirely new toilet valve construction. It is important from a practical standpoint that a device be capable of being fitted onto an existing assembly. A major difficulty with attempting to devise such a device arises from the very wide variety of valve assemblies which are used in toilets and a universal device was not believed possible. Although most tank trip handles are mounted on the left-hand side of the toilet, there are still a substantial number of toilet tanks which have the handles mounted on the right-hand side. A device which is capable of being mounted on toilet tanks having the handle either on the right-hand or left-hand side would be far more useful.

SUMMARY OF THE INVENTION

It is an object of the present invention to provide a universal shut off device for stopping the flow of water from a toilet tank to a toilet bowl during the flushing of the toilet tank which device is universal and usable on toilet tanks having a trip handle either on the right-hand or left-hand side of the tank.

The present invention is for a universal shut off device for stopping the flow of water from a toilet tank to a toilet bowl during the flushing of the toilet and being mountable on toilet tanks having a handle on either the right-hand or left-hand side of the tank. The device is mounted on a toilet having trip handle means, a flush arm, a toilet tank, a toilet bowl, a tank ball and a valve seat on which the tank ball rests. Stop handle means are affixed to the wall of the toilet tank and positioned for operating from the exterior of the tank. Bendable and ductile operator arm means are pivotally attached to the wall of the toilet tank at its first end and being pivotable by moving said stop handle means and said operator arm means being positionable over the tank ball at its other end. Biasing means are positioned directly below the trip handle means on the inner surface of the toilet tank. The biasing means are affixed to the bendable and ductile operator arm means whereby when said stop handle means is turned, said operator arm is brought into contact with the tank ball to close the tank ball against the valve seat to stop the flow of water into the bowl and whereby the bendable and ductile operator arm means may be installed to extend either to the right or left of the trip handle means. Preferably the biasing means comprise a rod formed from an elastically bendable material and the rod has at least one loop formed therein and is linked to the bendable and ductile operator arm means.

BRIEF DESCRIPTION OF THE DRAWINGS

FIG. 3 is a side view partially in cross section of the handle and biasing means of the universal shut off device of the present invention.

FIG. 4 is a perspective view of the stop handle of the shut off device of the present invention.

FIG. 5 is a perspective view of the trip handle of the device of the present invention.

FIG. 6 is a side view, partially in cross section of the valve seat and float valve together with the end of the bendable and ductile operator arm of the device of the present invention.

DESCRIPTION OF THE PREFERRED EMBODIMENTS

Figure 1:
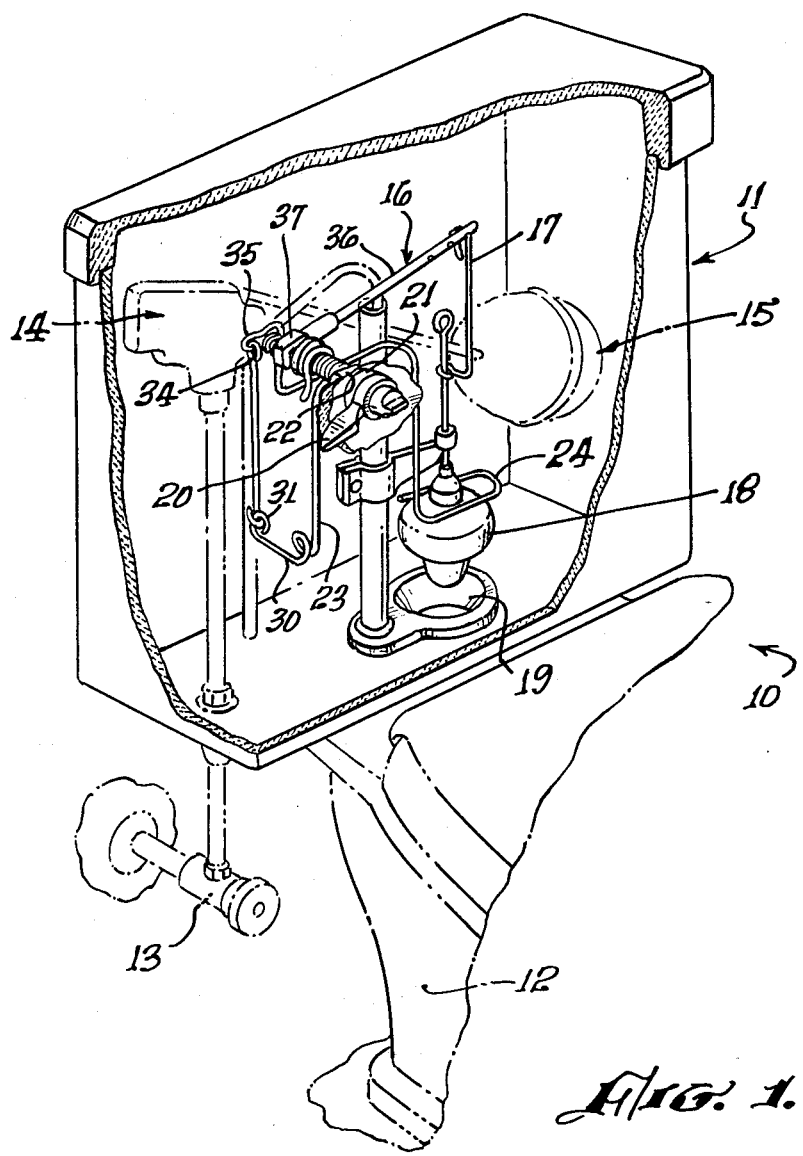
FIG. 1 is a perspective view partially cut away of a toilet tank containing the shut off device of the present invention.

A toilet 10 is shown in perspective view partially cut away in FIG. 1 and has a toilet tank 11 and a toilet bowl 12. The toilet tank is provided with a source of water controlled by a shut-off valve 13 and a float valve assembly 14 which is conventional. Float valve assembly 14 has a conventional float valve 15.

Like conventional toilet flush assemblies, the device of the present invention has a flush arm 16 which operates through a flush arm link 17 to raise a flapper valve 18. Flapper valve 18, once lifted, floats and permits the flow of water through valve seat 19 and into toilet bowl 12. When the water level nears the bottom of the tank, the flapper valve 18 rides down on the surface of the water until it once again seats in valve seat 19 and is held therein the water which is passed into the tank through float valve assembly 14. The device of FIG. 1 differs from conventional flush assemblies, however, in that it has means for pushing the flapper valve 18 into the valve seat 19 at an early stage of the flushing operation. This, of course, is useful when the toilet bowl is plugged and would otherwise overflow. The details of the shut-off assembly are shown best in exploded view in FIG. 2 where flush handle 20 is held in flush handle collar 21 which is held to the toilet tank wall by nut 22. A conventional square shank 9 fits in the square opening of the toilet tank 11 and prevents the turning of flush handle collar 21. Nut 22 also holds brass spring 23 directly below the flush handle on the inner surface of the toilet tank wall. A bendable wire 24 is positionable against flapper valve 18 and serves to move it downwardly against valve seat 19 at any stage of the flushing action. Bendable wire 24 has a threaded end 25 which passes through a hole 26 in flush handle 20. The threaded end is screwed into a threaded opening 27 in stop handle 28. A set screw 29 may be tightened against threaded end 25 to prevent the turning of stop handle 28 with respect to threaded end 25. In this way, the stop handle 28 may be turned in either direction which permits the unit to be used in tank constructions where the handle is on either side of the tank. An alternate stop handle configuration is also shown in FIG. 2 and indicated by reference character 28' and it likewise has a threaded opening 27' and a set screw 29'.

Brass spring 23 provides biasing means to return the bendable wire 24 to its normal position. A bottom arm 30 has an end loop 31 which attaches to a bottom loop 32 in brass connecting link 33. A top loop 34 is linked to a loop 35 in bendable wire 24. It can be readily seen by viewing FIG. 2 that bendable wire 24 may be positioned either as shown in the drawings or may be turned 180 degrees from its position in FIG. 2 and still be pulled downwardly by brass spring 23 through brass connecting link 33. This permits the shut off assembly of the present invention to be used in tanks having the handle either on the right-hand side of the toilet tank or the left-hand side thereof.

Another feature which permits this ambidexterity is the mounting of the flush arm to the flush handle. Flush arm 36 is held to flush arm adaptor 37 by a set screw 38. Flush arm adaptor 37 has a square hole 39 which has a plurality of threaded openings 40. Square hole 39 fits over square shank 41 of flush handle 20 and may of course be mounted either as shown in FIG. 2 or at 180 degrees thereto. Set screw 8 is threaded into adaptor 37 and holds it on square shank 41.

Figure 2:
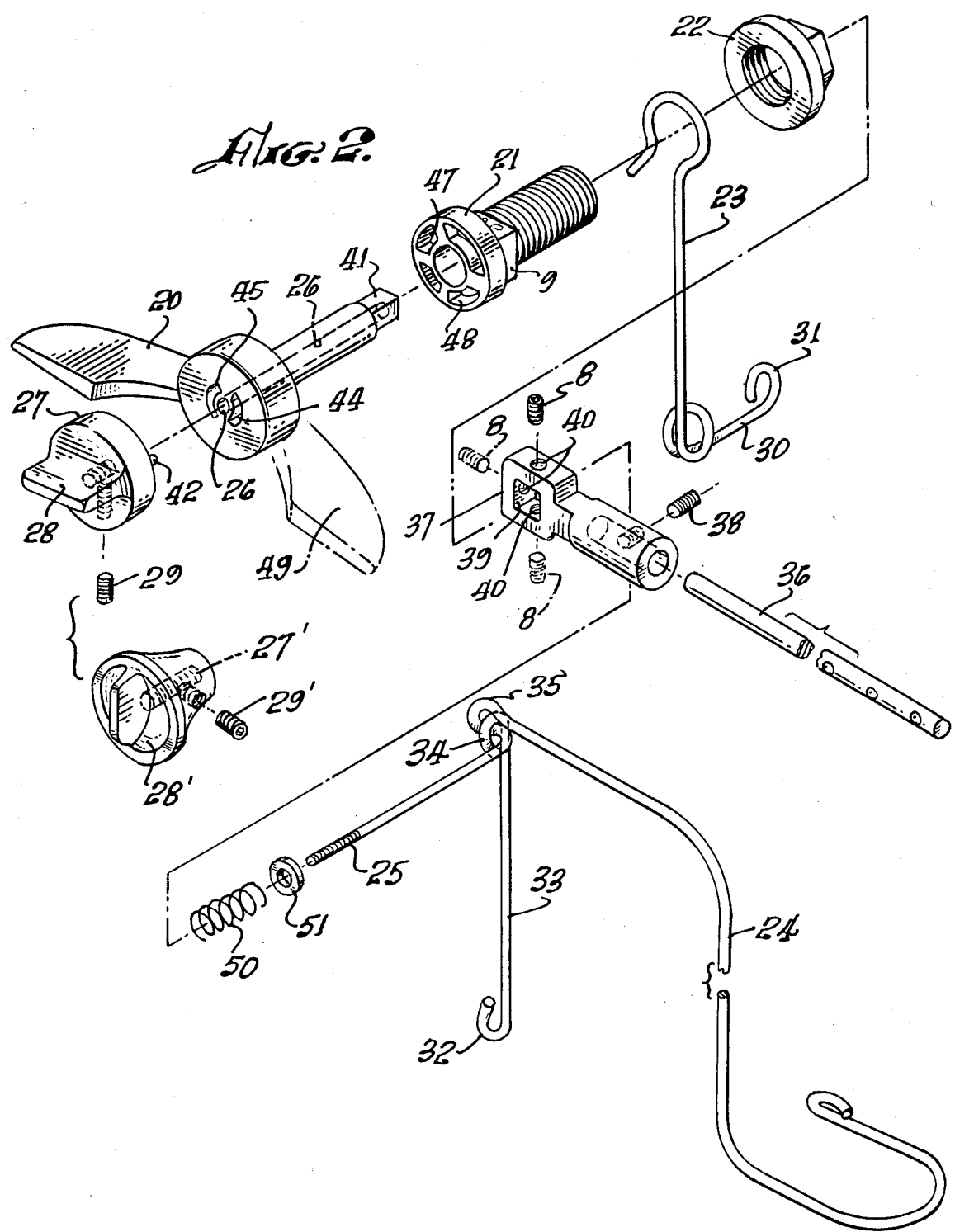
FIG. 2 is an exploded perspective view of the universal shut off device of the present invention.

To further assist in ease of operation, the movement of bendable wire 24, which comprises the operator arm of the assembly of the present invention, is limited by the interaction of pins 42 and 43 of stop handle 28 in slots 44 and 45 of handle 20 (pin 43 is shown both in FIG. 2 and FIG. 4). Likewise, the movement of flush handle 20 is limited by the interaction of pin 46 in slot 47. For toilets where the handle is mounted on the right-hand side, pin 46 fits in slot 48 since flush handle 20 is then mounted as shown by the phantom lines 49 of FIG. 2.

The assembled stop handle is shown in cross-sectional view in FIG. 3 where it can be seen that coil spring 50 and washer 51 apply a biasing force against the bendable wire 24 and hold stop handle 28 against flush handle 20. Coil spring 50 is compressed when stop handle 28 is screwed onto the threaded end 25 of bendable wire 24.

As also clearly evident in FIG. 3, a spring loop 50 is formed in brass loop 23. Spring loop 50 enhances the biasing effect of spring 23 and also assists in adjusting the amount of biasing since it permits a certain amount of ductile movement past the elastic limit so that the spring may be adjusted to an optimum tension for any particular installation.

In operation the unit is installed by placing the flush handle collar 21 into the square hole in the toilet tank wall and inserting the flush handle in one end and placing brass spring 23 over the threaded portion of collar 21 and tightening nut 22 against it. Flush arm adaptor 37 is placed over square shank 41 and oriented either to the left or right depending upon the location of the handle on the tank. Coil spring 50 and washer 51 are placed over threaded end 25 which is inserted through hole 26 of handle 20 and stop handle 28 is threaded on the end thereof after compressing coil spring 50. Bendable wire 24 is oriented either to the left or the right depending upon the position of flush handle 20 on the wall of the toilet tank. Then brass connecting link 33 is attached at the bottom to brass spring 23 and at the top to loop 35 and bendable wire 24. Bendable wire 24 is then bent so that it does not interfere with the normal operation of the toilet and is held in that position by the downward pull of brass connecting link 33 on the arm. Then when it is desired to stop the flushing of the toilet, stop handle 28 is turned flexing brass spring 23 and moving bendable wire downwardly as indicated in FIG. 6 against the float valve or flapper valve. It is, of course, evident that the link between flush arm 36 and flapper valve 52 may be a pair of rods as shown in FIG. 1 or a chain or other link such as indicated by reference character 53 of FIG. 6.

While the device of the present invention has shown biasing means comprising an elastic brass rod having a spring loop therein, it is, of course, within the scope of the present invention that other biasing means such as a coil spring could be used. It is important, however, that the biasing means be positionable so that they are capable of returning the operator arm to its out-of-the-way position when mounted either to the left or the right of the flush handle. A coil spring for instance could, however, readily be used.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A universal shut off device for stopping the flow of water from a tank to a toilet bowl during the flushing of the toilet and being mountable on toilet tanks having a handle on either the right-hand or left-hand side of the tank, said device comprising:

- a toilet having trip handle means, a flush arm, a toilet tank, a tank bowl, a tank ball and a valve seat on which the tank ball rests;
- stop handle means affixed to the wall of the toilet tank and positioned for operating from the exterior of the tank;
- bendable and ductile operator arm means pivotally attached to the wall of the toilet tank at its first end and being pivotable by moving said stop handle means and said operator arm means being positionable over the tank ball at its other end; and
- biasing means positioned directly below said trip handle means on the inner surface means on the inner surface of the toilet tank, said biasing means being affixed to said bendable and ductile operator arm means, whereby when said stop handle means is turned, said operator arm is brought into contact with the tank ball to close the tank ball against the valve seat to stop the flow of water into the bowl and whereby said bendable and ductile operator arm means may be installed to extend either to the right or left of the trip handle means; wherein said biasing means comprises a rod formed from an elastically bendable material, said rod having at least one loop formed therein and being affixed to the wall of the toilet tank, said rod being linked to said bendable and ductile operator arm means by said at least one loop and said elastically bendable rod is linked to said bendable and ductile operator arms means by a link having a loop in its lower end which is affixed to said loop of said link, said link having a further loop in its upper end which is affixed to yet a further loop in the bendable and ductile arm means.

2. The shut off device of claim 1 wherein said stop handle means further includes turn limiting means mating with said trip handle means whereby the turning movement of the stop handle is limited and thus the movement of the bendable and ductile operator arm is limited.

3. The shut off device of claim 2 wherein said turn limiting means comprises a pair of pins formed on said stop handle and a pair of mating slots formed in said trip handle means.

4. The shut off device of claim 1 wherein said flush arm is mountable so that it extends either to the right or the left of the trip handle.

5. The shut off device of claim 4 wherein said flush handle has a rectangular opening at one end thereof and the shank of said trip handle is rectangular and fits closely into said rectangular opening in said flush handle.

* * * * *